United States Patent
Phan Vogel (10) Patent No.: US 8,028,259 B2
(45) Date of Patent: *Sep. 27, 2011

(54) AUTOMATED METHOD AND APPARATUS FOR VERY EARLY VALIDATION OF CHIP POWER DISTRIBUTION NETWORKS IN SEMICONDUCTOR CHIP DESIGNS

(75) Inventor: Dieu Q. Phan Vogel, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 492 days.

This patent is subject to a terminal disclaimer.

(21) Appl. No.: 12/032,417

(22) Filed: Feb. 15, 2008

(65) Prior Publication Data
US 2009/0210836 A1 Aug. 20, 2009

(51) Int. Cl.
*G06F 17/50* (2006.01)
(52) U.S. Cl. ........ 716/111; 716/120; 716/127; 716/129; 716/130; 703/16
(58) Field of Classification Search ................ 716/5, 13, 716/14; 703/16
See application file for complete search history.

(56) References Cited

U.S. PATENT DOCUMENTS

| | | | |
|---|---|---|---|
| 5,581,475 A * | 12/1996 | Majors ............................. | 716/10 |
| 6,086,628 A | 7/2000 | Dave et al. | |
| 6,097,886 A | 8/2000 | Dave et al. | |
| 6,112,023 A | 8/2000 | Dave et al. | |
| 6,132,109 A | 10/2000 | Gregory et al. | |
| 6,230,303 B1 | 5/2001 | Dave | |
| 6,305,000 B1 * | 10/2001 | Phan et al. ........................ | 716/5 |
| 6,349,401 B2 * | 2/2002 | Tamaki ............................. | 716/2 |
| 6,378,110 B1 | 4/2002 | Ho | |
| 6,405,346 B1 * | 6/2002 | Nawa ................................. | 716/2 |
| 6,675,139 B1 * | 1/2004 | Jetton et al. ...................... | 703/17 |
| 6,725,439 B1 * | 4/2004 | Homsinger et al. ............ | 716/12 |
| 6,944,552 B2 | 9/2005 | Francom et al. | |
| 7,016,794 B2 * | 3/2006 | Schultz ............................ | 702/64 |
| 7,089,129 B2 * | 8/2006 | Habitz ............................. | 702/65 |
| 7,096,447 B1 | 8/2006 | Li et al. | |
| 7,134,099 B2 | 11/2006 | Collins et al. | |
| 7,146,303 B2 | 12/2006 | Roy et al. | |
| 7,152,216 B2 | 12/2006 | Kapoor et al. | |
| 7,240,316 B2 * | 7/2007 | Regnier ........................... | 716/11 |
| 7,305,639 B2 | 12/2007 | Floyd et al. | |
| 7,480,842 B1 | 1/2009 | Young et al. | |
| 2001/0015464 A1 * | 8/2001 | Tamaki ......................... | 257/393 |
| 2002/0112212 A1 | 8/2002 | Cohn et al. | |

(Continued)

OTHER PUBLICATIONS

"Algorithm to Share Physical Processors to Maximize Processor Cache Usage and Topologies", IBM Docket No. POU920070211US1, filed Jan. 11, 2008.

(Continued)

*Primary Examiner* — Phallaka Kik
(74) *Attorney, Agent, or Firm* — William A. Kinnaman, Jr.

(57) ABSTRACT

Validation of full-chip power distribution networks can be performed very early, and continuously throughout the design cycle, to detect real physical power connection problems and enable early correction of power grid designs using early floor plan and power grid design data. Common power connection and distribution errors are automatically addressed as an integral part of the early chip floor planning and chip power build processes providing efficient solutions requiring no extra wiring resource to be implemented and reducing the runtime of required final full-chip physical design checks, and the overall design cycle.

20 Claims, 4 Drawing Sheets

U.S. PATENT DOCUMENTS

| | | |
|---|---|---|
| 2004/0078767 A1* | 4/2004 | Burks et al. .................. 716/8 |
| 2004/0172232 A1 | 9/2004 | Roy et al. |
| 2005/0102644 A1 | 5/2005 | Collins et al. |
| 2005/0210430 A1* | 9/2005 | Keller et al. ................. 716/4 |
| 2005/0278676 A1 | 12/2005 | Dhanwada et al. |
| 2006/0085770 A1 | 4/2006 | Kapoor et al. |
| 2006/0184905 A1 | 8/2006 | Floyd et al. |
| 2006/0265681 A1 | 11/2006 | Bakir et al. |
| 2007/0094630 A1 | 4/2007 | Bhooshan |
| 2008/0127020 A1* | 5/2008 | Rittman ....................... 716/10 |
| 2008/0141196 A1* | 6/2008 | Ohshima et al. ............. 716/5 |
| 2009/0210835 A1* | 8/2009 | Phan Vogel .................. 716/5 |
| 2011/0047523 A1* | 2/2011 | Garcia, et al. ............... 716/122 |

OTHER PUBLICATIONS

U.S. Appl. No. 12/032,276, Office Action mailed Aug. 24, 2010.
U.S. Appl. No. 12/032,276, Notice of Allowance mailed Feb. 11, 2011.
U.S. Appl. No. 11/055,863, Office Action mailed Apr. 5, 2007.
U.S. Appl. No. 11/055,863, Notice of Allowance mailed Jul. 30, 2007.

* cited by examiner

AUTOMATED METHOD AND APPARATUS FOR VERY EARLY VALIDATION OF CHIP POWER DISTRIBUTION NETWORKS IN SEMICONDUCTOR CHIP DESIGNS

CROSS-REFERENCE TO RELATED APPLICATIONS

This application contains subject matter related to the following co-pending applications, each of which is assigned to the same assignee as this application, International Business Machines Corporation of Armonk, N.Y. Each of the below listed applications is hereby incorporated herein by reference in its entirety.

Co-pending U.S. patent application, Ser. No. 11/055,863, filed Feb. 11, 2005, now U.S. Pat. No. 7,305,639 and entitled "Method and Apparatus for Specifying Multiple Voltage Domains and Validating Physical Implementation and Interconnections in a Processor Chip."

U.S. patent application Ser. No. 12/032,276, filed on even date herewith and entitled "Method and Apparatus for Efficient Power Region Checking of Multi-Supply Voltage Microprocessors."

TRADEMARKS

IBM® is a registered trademark of International Business Machines Corporation, Armonk, N.Y., U.S.A. Other names used herein may be registered trademarks, trademarks or product names of International Business Machines Corporation or other companies.

FIELD OF THE INVENTION

This invention relates to power distribution network designs of semiconductor chips. In particular, the invention provides a much earlier, but very effective, validation method for full-chip power grid designs than conventional full-chip physical design checks. More specifically, the method is applicable to any semiconductor chip design when power net connectivity information is available in its chip floor plan and chip power grid layout.

BACKGROUND OF THE INVENTION

Power connection problems typically are not identified until late in the design phase when full-chip layout-versus-schematic (LVS) check and/or full-chip power grid analysis (PGA), which includes electromigration (EM) and voltage (IR) drop evaluations, are performed. These problems usually have to be corrected, either manually or with various post-processing scripts, at each iteration of final chip assembly.

As a chip floor plan evolves over time, a chip power grid becomes susceptible to connectivity issues. A minor change in circuit placement, a circuit's reserved metal blockage, or a circuit's power image may result in new power distribution problems. Unfortunately, such issues are often not identified until full-chip physical design (PD) checks are performed. Then, rebuilding an existing chip power distribution network may even become necessary in order to resolve the new conflicts. However, complete re-implementation of full-chip power grid for designs that are already in controlled engineering change (EC) mode is usually not desired, as this action may result in changes that may require design re-qualifications beyond the original intended circuit's EC.

Pre-processing of design data is required for conventional PD checks. Both a logical and a physical netlist representing the full-chip hierarchy are constructed from the graphical design database. These are used as inputs for full-chip LVS or LVS-continuity (LVSC) based check. Both the logical and the physical chip netlists are typically very large and very time-consuming to produce. In addition to these netlists, full-chip PGA also needs more complete circuit and technology power characteristics to perform its checks.

Construction of the logical netlist is based on the connectivity information already existing in the chip floor plan. Connectivity information in the chip floor plan, which includes all power nets, is typically created automatically by a computer-aided process, which translates and imports the full-chip logical description (usually coded in a hardware description language) into the graphical chip floor plan in the physical design database.

Construction of the physical netlist is based on the actual implementation of the complete physical design hierarchy including all metallurgy and via structures for all power nets. For the full-chip power grid, power net connectivity is created automatically by the automated chip power router as part of its routing process.

The chip physical netlist also expects a complete full-chip power via structure. Power vias are usually created automatically by the same automated chip power router and based on the power net connectivity already existing in the routed power grid. The success of the power via generation step is highly dependent on the quality of the input power grid.

In addition to the chip power via generation process, advanced chip power routing methods also support personalization of the chip power grid on specific metal layers for selective circuits. Such personalization is performed after a full-chip power grid is created by an automated router. An effective personalization technique called "power pin extensions" is used to add power wiring continuity to the full-chip power grid for any power metal of any circuit. This technique allows design flexibility for the custom circuit's power grid while maintaining the overall robustness of the complete chip power distribution. Similar to the above power via generation process, the result of such personalization also depends on the quality of the input power grid, ideally with zero shorts or other errors between metal layers. It is therefore costly to wait until final full-chip checks to perform needed corrections, and then to repeat the whole routing process.

Finally, after translating the design data into netlists to be used as inputs for checking, the actual full-chip checks are themselves very memory- and run-time intensive. As large chips such as chip multiprocessor (CMP) designs continue to grow in demand and grow to contain more than one billion transistors, the speed of these full-chip checking processes is increasingly a major concern. These checking jobs not only take a long time to complete, but also when they complete, additional analysis is still necessary to identify the actual source of problems. For example, a full-chip LVS or LVSC check typically finds the first short and then stops. An extra function is then required to trace the approximate location of the short. After this short is fixed, a repeat of LVS or LVSC is needed to find the next problem.

Some chip distribution network contains power metals that add no value to the complete chip power distribution network. These metals typically are created by the automated power router for certain types of voltage region and macro placement boundary conditions. They typically are very short wires and are discovered only by chip EM or IR-drop analysis. For instance, if large IR-drops are discovered because of truncation at macro cell boundaries, the underpowered rails should be removed from the network to enable a more efficient solution. If such problems are discovered too late in the design cycle, less ideal solutions, such as those requiring extra wiring resources, may have to be implemented.

SUMMARY OF THE INVENTION

In accordance with the present invention, method and apparatus are provided for very-early detection of full-chip power distribution errors due to the physical implementation process. These checks are usable as soon as an initial chip power grid is built based on information available at that point in the design process from the initial chip floor plan, which includes abstracts generated using circuit libraries and global chip layouts and optimized network interconnections generated using circuit design software. This early full-chip power check sets are interspersed between different power and design steps in creating a final chip layout. This flexibility enables much earlier corrections of chip power grid and chip floorplan design errors. In contrast, full-chip physical design checking processes that follow the creation of the final chip layout must be done before design errors are fed back to preceding process steps for corrections.

The early full-chip power checks employ an Early Power Integrity Checking (EPIC) toolset. Similar to EPRC described in the above identified application Ser. No. 12/032,276, the checks make use of connectivity information that already exists in the chip power grid layout and in the chip floor plan. These checks are able to detect many different types of LVS power opens and shorts by checking the full-chip power grid against both pin and blockage information in the circuit abstracts. In the case of power short checking, these tools provide a list of shorts detected either in the power grid or in the floor plan. This technique is very efficient compared to the conventional use of LVS, which finds the first short and then stops, thus requiring a repeat of the check to find the next problem. LBS or LVS continuity-based checks also require an extra processing step to trace the location of short.

The following are three examples of the toolset's capabilities, which are used to evaluate the complete chip power grid:

a. Power Open Checks

An example of this type of check is to detect floating power metal that exists in a complete power grid of a chip floor plan. Floating power metal is metal that does not intersect with metal either from above or below and is not connected to any circuit's power pins. Since the complete power grid has already undergone the region and power pin extension process, the identified floating metals obviously provide no value and therefore can be removed to allow additional signal wiring channel.

Another example is to find chip power antennas before vias are generated for the complete power grid. Power antennas are metals that intersect with a metal of a different power domain from above and below, so that no connection can be made. Such metals obviously do not contribute to the efficient distribution of power on the chip. The identified metals therefore can be changed to the application power plane where connection can be made, thus improving the overall robustness of the full chip power distribution.

This type of check prevents many missing-power-via (NMC) and uncovered-power-stripes (LVS) errors.

b. Power Short Checks

An example of this type of check is to detect new chip power shorts due to a floor plan placement change or a circuit abstract change. With macro abstracts, chip power grid shorting to a macro pin or to macro blockages is identified. In controlled engineering-change (EC) design mode, this check also helps to determine the type of EC required to correct an existing power grid with minimum effort.

EPIC functions can display coordinates of all shorts in the floor plan for any requested metal layer, thus saving considerable computer and engineering resources. In a full-chip LVS check, or even with early GI LVSC-based checks, power shorts are usually hard to trace and, as mentioned, are usually detected only one short at a time.

c. Macro's Power Open Check

This check identifies custom macros that are disconnected from the chip power grid. It checks the macro's highest power metal pins to ensure connection to the chip power grid on either the same or the next higher level of metal.

As pointed out above, the EPIC toolset speeds up checking the power grid design by using early design information that already exists in both the chip floor plan and the routed chip power grid. This eliminates the need to build a full logical representation of the complete power metallurgy and power via structure prior to testing (as typically required by conventional full-chip LVS and PGA processes). It also takes advantage of the overall chip integration and chip power routing methodology to enable quick algorithms to detect flagrant chip power grid errors. For example, by design convention all chip floor planning components must provide efficient power distribution internally up to the same highest level of metal that is used for internal signal wiring. Standard cells typically make power connections based on their placement. Custom macros, however, are allowed to have a custom power grid. Thus the chip power routing process must guarantee, at the minimum, continuity of the implemented chip power grid to the macro's highest level of metal. By limiting applicable macro-related power integrity checks to detect all floor planning components that do not meet this requirement, the invention allows for corrective actions to be taken much sooner than waiting for final chip LVS checks.

Therefore, it is an objective of this invention to provide an improved chip floor plan design process, which produces a high quality full-chip power distribution network.

Another objective of the invention is to enable early checking results and to speed up checking algorithms, by using early design information that already exists in the chip power grid and the chip floor plan.

A further objective of the invention is to provide mechanisms to quickly identify new power connection problems due to chip floorplanning changes, which include circuit placement and/or abstract changes.

BRIEF DESCRIPTION OF THE DRAWINGS

The foregoing and other features and advantages of the present invention are apparent from the following detailed description taken in conjunction with the accompanying drawings in which.

The detailed description explains the preferred embodiments of the invention, together with advantages and features, by way of example with reference to the drawings.

DETAILED DESCRIPTION OF THE INVENTION

Figure 1:
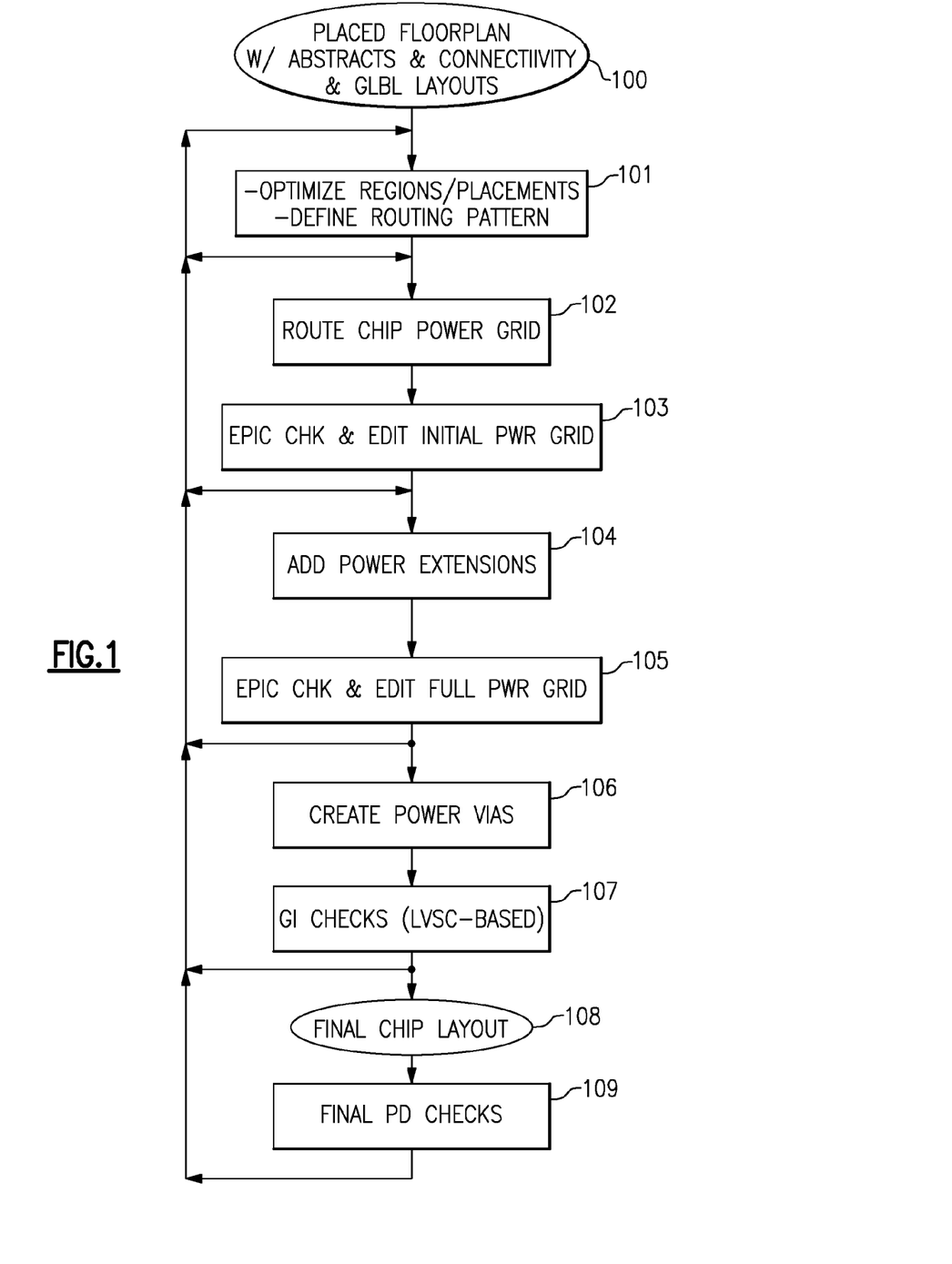
FIG. 1 is a schematic showing how the invention's early power integrity checking (EPIC) toolset is used not only to complement the plan-of-record (POR) power verification process, but also to improve the overall routing performance and the quality of the resulting chip power grid.

FIG. 1 illustrates an enhanced chip power routing and verification process, which uses the invention's EPIC toolset to validate early versions of the chip power grid. As described in the above-identified co-pending application Ser. No. 12/032,276, a chip floor plan 100 is generated from circuit abstracts and a circuit net list. Full-chip power routing of all metals 102 typically starts after timing-driven placements and power routing controls are defined 101 for the given input chip floor plan 100. Certain EPIC checking functions 103 are meant to be used early in the design process to highlight possible improvements in the chip floor plan and/or in this initial chip power grid. For instance, a power shorting to a circuit abstract may result in a circuit placement change or a power routing pattern change. Another example is to find all multi-power domain macros whose highest power metal pins have no accessibility to the initial chip power grid on either the same or the next higher level of metal. Solving this type of problem may involve adjustment of macro placement, metal blockage, and/or the power routing specification 101. Some early analysis on the initial chip power grid also helps eliminate potential underpowered rails, which likely exist because of truncation at macro cell boundaries and will likely result in large IR-drops that are not discovered until final chip PGA. Detecting the above types of problems at this early phase of implementation enables the more efficient solution to be implemented as a preventive correction for the eventual final power grid. Analyzing and eliminating anticipated problems from the preliminary power grid 103 proves beneficial, not only in improving the overall quality of the final power grid, but also in reducing run-time for the subsequent power grid post-processing and verification steps 104, 106, 107, and 109. After the default chip power grid is taken through personalization processes that improve the overall continuity of the chip power grid 104 (e.g., adding wire extensions connecting independent voltage regions or custom macros' power pins to the full-chip power grid), other EPIC functions are used 105 to detect power connection problems that remain in the complete chip power grid before starting the chip power via generation process 106. For instance, any remaining power grid discontinuity that is not addressable by the automated power pin extension process would surface at this phase 105. Examples of such problems are power antennas or uncovered macro power pins. These are real power opens and shorts usually not discovered until later either by (1) LVSC-based checks, which are used to detect conflicts between global-infrastructure components including clock, power, and 10 wires 107; or even much later by (2) full-chip PD checks 109, which include LVS, DRC, and PGA based on final full-chip layout data 108. In this modified flow, the chip power grid is essentially guaranteed to be free of most common types of power shorts and opens prior to the power via generation process 106. At this point, chip power via generation is almost a trivial correct-by-construction process, which should not cause any new power opens and shorts in final PD checks 109.

Figure 2A:
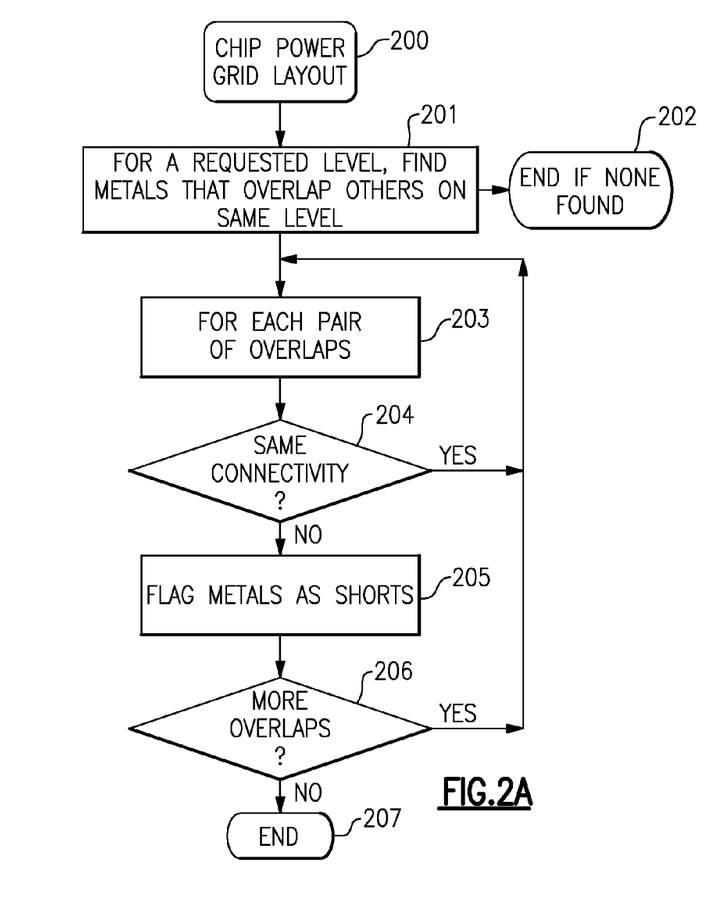
FIGS. 2A and 2B are flow diagrams. The process illustrated in FIG. 2A is for finding power shorts and the one in FIG. 2B is for finding power opens that exist in the chip power grid layout due to power routing metal conflicts.
Figure 2B:
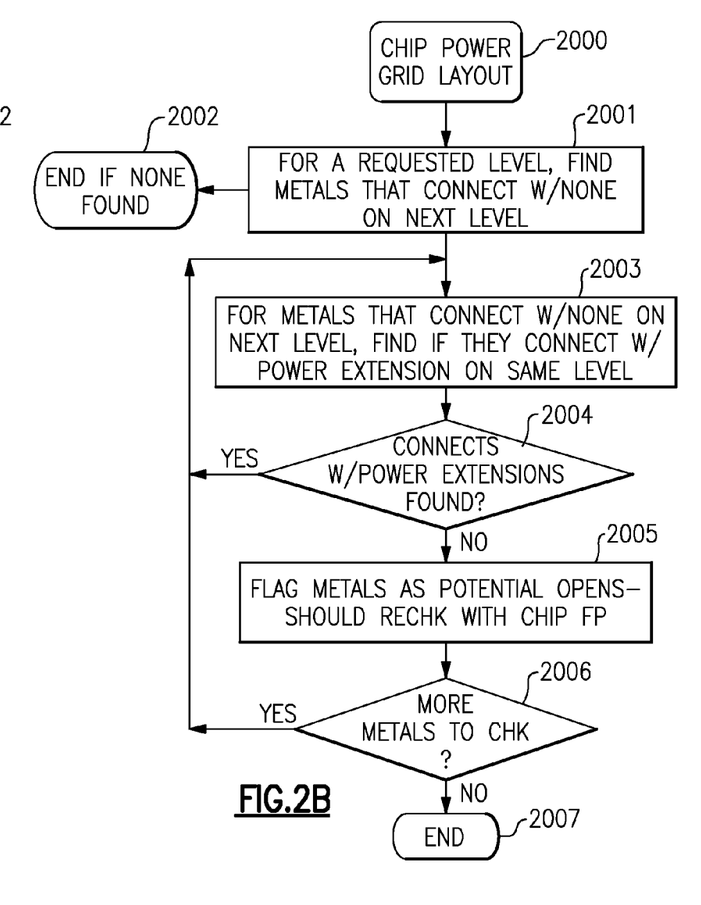

FIG. 2 is an example of checking capabilities that are applicable to a stand-alone full-chip power grid. The flowchart in FIG. 2A shows a quick checking method for finding power short that exists in the chip power layout 200 provided as the input. If metals of the same level are found overlapping each other 201, then each pair of overlaps has to be examined for same connectivity 203, 204. If connectivity data of the overlapping pairs are different, they are flagged as being power shorts 205. The evaluation repeats for each pair of overlaps 206. The right flowchart in FIG. 2 illustrates a quick algorithm for finding potential opens for early evaluation. Here, any power metal that has no connection with either a metal on the next level 2001 or a power wire extension on the same level 2003 is flagged as a "potential" open 2005. Since only the chip power grid 2000 is provided as input for this check, metals that are flagged as "opens" by this check are intended only as quick warnings. These "opens" may not be real as they may depend on the metal level and how power continuity of this level is addressed by the overall integration methodology.

Figure 3A:
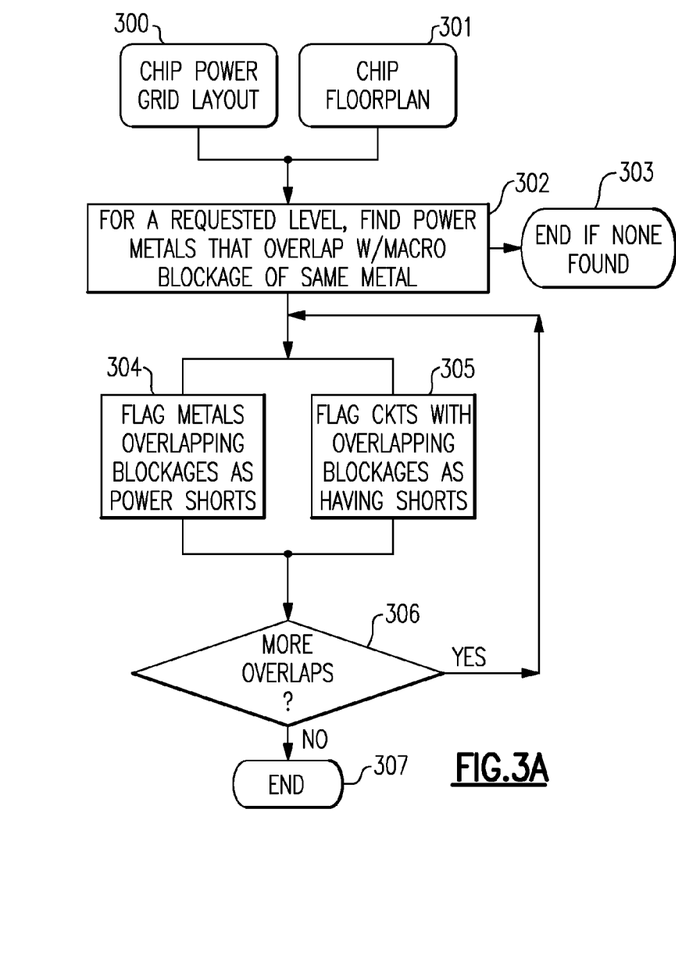
FIGS. 3A and 3B are flow diagrams for finding two types of common power shorts associated with circuit abstracts placed in the chip floor plan. Illustrated process for FIG. 3A is for finding power short between a chip power grid metal and a circuit's metal blockage shape, which represents reserved metal usage internal to the circuit. The process illustrated in FIG. 3B is for finding power short between a chip power grid's metal and a circuit's pin shape for which connectivity information has to be extracted from the chip floor plan for validation versus that of the chip power metal.
Figure 3B:
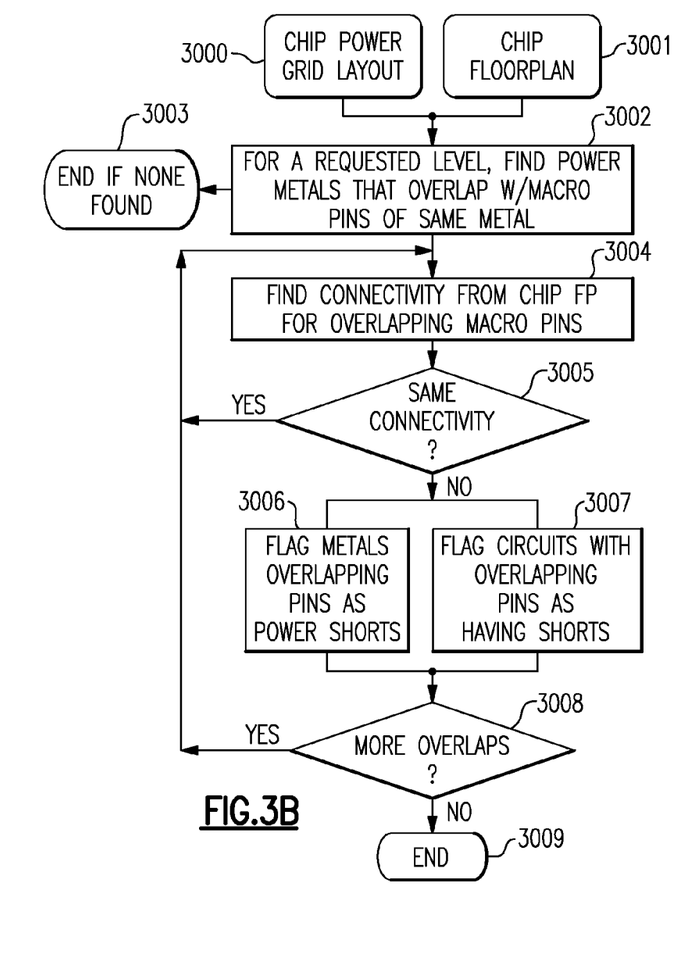

FIG. 3 is an example of checking capabilities that are applicable to a full-chip power grid against an input chip floor plan. The flowchart in FIG. 3A is an example of finding power shorting to a circuit's reserved wiring track, which is represented by metal blockage shape in circuit abstracts. For a metal level under test, any power wire in the full-chip power grid 300 that overlaps a metal blockage shape found in the hierarchy of the input chip floor plan 301 is flagged as a power short 304. The circuit abstract that contains the metal blockage shape is also flagged as having short 305. The right flowchart in FIG. 3 is an example of finding power shorting to a circuit's pin. For a metal level under test, any wire in the full-chip power grid 3000 that overlaps a metal pin shape found in the hierarchy of the input chip floor plan 3001 has to be examined for same connectivity 3002, 3004. If connectivity is different 3005, both the power metal and the circuit that contain the overlapping pin shape are flagged as shorts 3006, 3007.

Figure 4A:
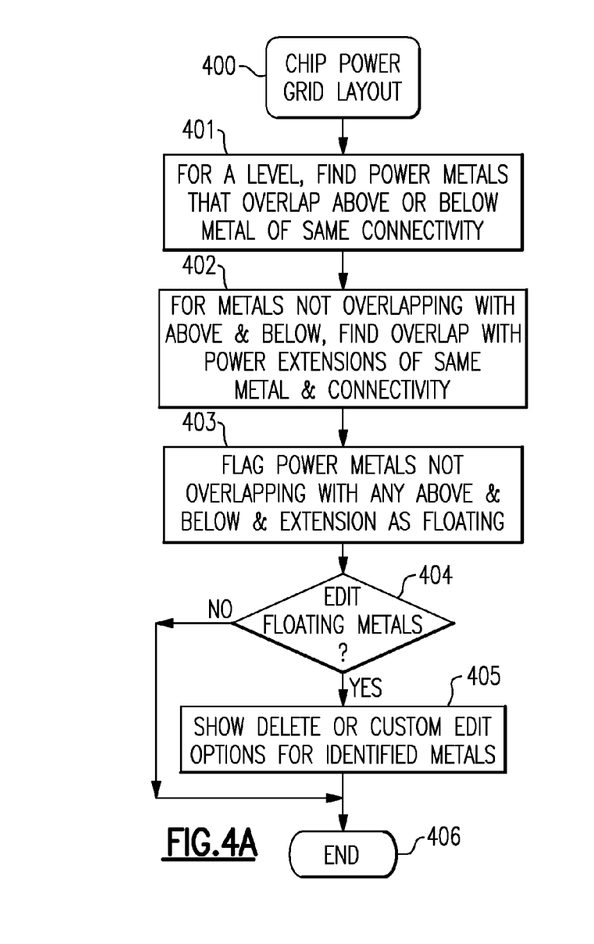
FIG. 4A is a flow diagram of a process for finding floating power metals.
Figure 4B:
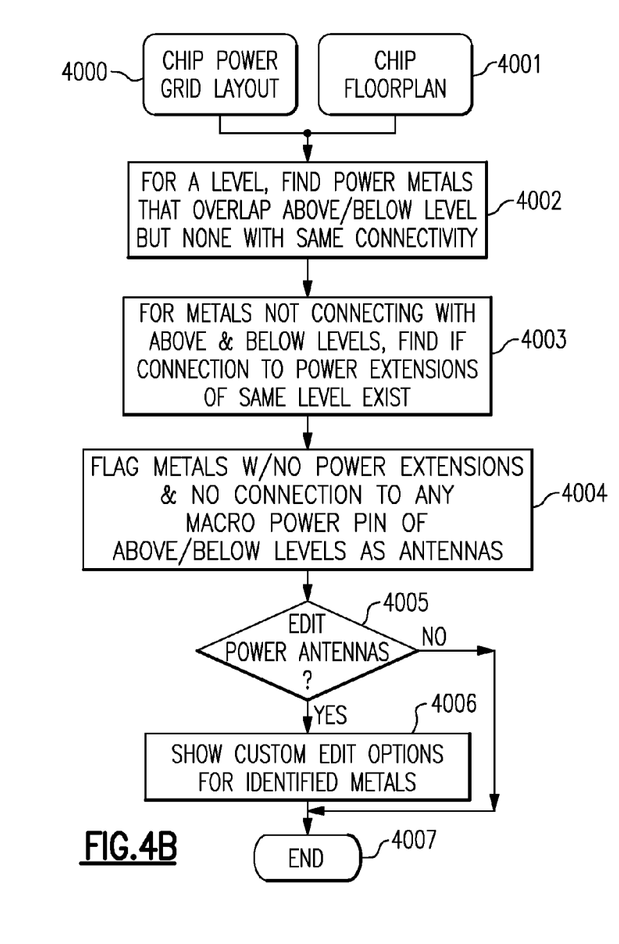
FIG. 4B is a flow diagram of a process for finding power antennas that exist in the chip power grid based on the chip floor plan data. These processes take into account the power pin extension technique, which is provided by advanced chip power routing methodology to add wiring continuity to a standard chip power grid for any configuration of circuit's power pins.

FIG. 4 is an example of checking capabilities that find power metals that add no value to the complete chip power distribution network. These metals are created by the automated router for certain types of placement boundary conditions. They typically are wires for which connections to the next metal can not be made due to either lack of metal intersection or to lack of metal of the desired power domain. Metals of the first case are referred to as floating metals and of the latter case as power antennas. Checking algorithms detecting these two types of power opens examine power connections based on interactions between the metals in the full-chip power grid as well as between metals in the full-chip power grid and power pins in circuit abstracts placed in the chip floor plan. For quicker detection of routing errors, these algorithms can be limited to checking only the metals in the full-chip power grid. An example of this quick check is as shown in the left flowchart of FIG. 4. This flowchart illustrates how floating metals are detected based only on the input chip power grid and assuming power pin extension capability. As depicted in this flowchart, if a metal in the input full-chip power grid 400 is found not connecting with any metal from above or below 401, and not with any power extension of the same level 402, it is flagged as a floating metal 403. Custom editing options are made available with recommendation for such metals to be deleted 405, and for power pin extension process to be rerun in EC mode as applicable. The right flowchart in FIG. 4 shows how power antennas are detected. This example assumes that in addition to power pin extension capability, power metals in the input chip power grid may also connect directly to an overlapping macro's power pin of same connectivity in the hierarchy. Power antennas are those that intersect with a metal of a different power domain from above or below, so that no connection can be made. In this example, based on connectivity information in both the input chip power grid 4000 and the input chip floor plan 4001, if a metal in the input chip power grid is found overlapping with metal from above or below, but none with the same connectivity 4002, and this same power metal does not connect with any power extension of same level 4003, then this metal is also checked for overlapping with power pins of same connectivity in the floor plan hierarchy 4004. If all of the above criteria fail, the metal is flagged as a power antenna 4005. Since power antennas obviously do not contribute to the efficient distribution of power on the chip, EPIC will display custom editing options 4006, 4006 with recommendation that such identified power metals be deleted or be changed to another power domain (based on the majority of the overlapping metals from above and below) where connection can be made.

Early validation of the full-chip power grid using the real-time feedback to the chip floor planning process as well as to the actual design and implementation of the full-chip power grid. For instance, macro placements and chip power grid routing specifications can be optimized based on these early evaluations. The invention is also able to evaluate the quality of an intermediate routed power grid and provides suggested solutions to improve the outcome and runtime of time-consuming post-routing processes, such as adding power pin extensions and generating chip power vias.

In chip engineering change (EC) design mode, the invention helps to determine the type and the magnitude of EC, such as which metal layer in the chip power grid or which circuit macro's power plane needs correction in order to support the new change.

The early checking capabilities can identify power shorts and opens typically detected only by full-chip LVS checks. For both power opens and shorts, the checking algorithms can identify all problems for any level of metal. These cover all power connection errors that are due either to (1) the chip power implementation process (e.g., routing specification, or control setup required for personalization); or to (2) conflicting interactions between the implemented power grid and the chip floor plan's components.

The EPIC toolset is also able to identify obvious under-powered rails typically reported only by full-chip PGA. Examples of such problems include floating metals, power antennas, and uncovered macro power pins. Floating power metals are those that do not intersect with any metal from either above or below and that are not connected to any circuit's power pins. Power antennas are those that intersect with a metal of a different power domain from above or below so that no connection can be made. Uncovered macro power pins, which are also detectable by full-chip LVS, exist where the macro's highest power metals are not being connected to the next higher level of metal of the chip power grid. This type of power open check prevents many of final PD errors, which include missing-power-via, DRC minimum-area, LVS uncovered-power, and PGA IR-drop errors.

The checks speed up its checking algorithms by using early design information that already exists in both the chip floor plan and the routed chip power grid. This eliminates the need to build a full logical representation of the complete power metallurgy and power via structure (as typically required by conventional full-chip LVS and PGA processes). The invention also takes advantage of the overall chip integration and chip power routing methodology to enable quick algorithms for detecting flagrant chip power grid errors. For example, by design convention all chip floor planning components must provide efficient power distribution internally up to the same highest level of metal that is used for internal signal wiring. Standard cells typically make power connections based on their placement. Custom macros, however, are allowed to have a custom power grid. Thus the chip power routing process must guarantee, at the minimum, continuity of the implemented chip power grid to the macro's highest level of metal. By limiting applicable macro-related power integrity checks to detect all floor planning components that do not meet this requirement, the invention allows for corrective actions to be taken much sooner than waiting for final chip LVS check.

All power connection checking algorithms use power net connectivity data to check for connection of a requested power metal in succession against the metals above and/or below based on the chip's technology metallurgy characteristics and the power domain net name.

This checking technique does not require the complete full-chip power via structure to be implemented prior to checking. Power via generation is a correct-by-construction process that depends on the quality of the routed chip power grid. Thus it is advantageous to construct a high quality chip power grid to drive this time-consuming post-routing process.

For quick validation of macro-related power connection problems, the invention also makes use of logical power net connectivity data already existing in the input chip floor plan. Since the invention's checking method is for a chip floor plan that contains circuit abstracts, and not real circuit layouts (as in conventional LVS and DRC), its checking algorithms do not require as much memory and run time to complete. The invention's checking method is able to detect many different types of LVS power opens and shorts by checking the full-chip power grid against both pin and blockage information in the circuit abstracts.

The described checking methods are applicable to any number of metal levels. All checking algorithms can be limited to a specific metal layer and/or a specific power net name (e.g., VDD or VIO or GND).

Upper and/or lower metals to be checked for a metal-under-test can also be explicitly specified. This interface capability is to support reuse of program capabilities for newer technology metallurgy characteristics.

The set of physical design checking programs that have been described are applicable to a stand-alone full-chip power grid or to a full-chip power grid against an input chip floor plan.

The disclosed program capabilities below check a full-chip power distribution network for the following two types of common power shorts: (1) shorts due to the physical implementation process of the chip power grid; and (2) shorts due to conflicting interactions between the full-chip power grid and the circuit abstracts that are placed in the chip floor plan.

To find power shorts that are due strictly to metal conflicts in the full-chip power grid, checking functions are provided to find power metals overlapping other metals of the same level but of different connectivity. These errors are likely due to an inconsistent or obsolete power routing control specification versus a given chip floor plan.

To find power shorts that result from a floor plan placement change or a circuit abstract change, checking functions are provided to find any chip power metal that overlaps a macro blockage shape of the same metal level or a macro's pin of the same metal level but of different power connectivity. Macro's power connectivity is obtained directly from the chip floor plan for checking. This type of problem is likely due to an unexpected floor planning or circuit's abstract change.

For both of the above types of errors, all power shorts identified for each metal layer can be displayed all at once in the full-chip power grid. Coordinates of all macros containing power shorts with the full-chip power grid can also be highlighted in the input chip floor plan. This checking capability saves considerable computer and engineering resources. This is because in a full-chip LVS check, and even in a simplified global infrastructure (GI) LVSC-based check, power shorts are usually hard to trace and are reported only one at a time, each of which has to be fixed before the next problem can be identified.

The program capabilities below check a full-chip power distribution network for the following common types of power opens: (1) missing expected power connections; (2) unconnected macro powers; (3) floating power metals; and (4) power antennas.

To detect power opens that exist in the full-chip power distribution networks, checking functions are provided to find power stripes that have no connection to the expected next level of metal. Power connection to the next metal level can be made either (1) directly by overlapping with metal of the next level having the same connectivity; or (2) indirectly by connecting to a "power pin extension" of the same level, which connects to a macro's power pin of the same level, which in turn connects to the next level. Any metal in the full-chip power grid that meets neither of these criteria is highlighted as having power open.

An alternate quick checking function is also provided for finding circuit abstracts with power opens. Using the same power connection assumption as above, this algorithm is applied only to the highest metal of macro power pins. This is because the circuit's highest level of metal is usually required to have direct interface with the chip distribution network, while the internal macro power grid is guaranteed error-free by the circuit's design methodology. For each circuit's power domain, if no connection is found for the circuit's power pins of the highest metal with the chip power metal of the next level, then connection with power pin extensions on the same metal is checked for these macro power pins. If neither type of metal connection is found for the circuit's domain-under-test, the circuit is flagged as having power open.

A quick checking algorithm is also provided for detecting floating power metals that exist in the complete chip power grid. Floating power metal is metal that does not intersect with metal either from above or below and is not connected to any circuit's power pins. This check assumes that the complete power grid has already undergone the power pin extension process, thus such floating metals provide no value to the power distribution network. The check also provides an editing option to automatically remove the identified floating metals therefore providing additional free space for signal wiring channels.

Another easily detectable type of power open is the power antenna. Power antennas are wires that intersect with a wire of a different power domain from above and below, so that no connection can be made. Such wires obviously do not contribute to the efficient distribution of power on the chip. This check also provides additional automated editing options, which include (1) changing the connectivity of the identified antennas to another power plane where connection can be made; or (2) deleting the antenna to free up the channel for further personalization to improve the overall robustness of the full chip power distribution. With option (1), the corrected antennas can also be optionally changed to have smaller widths in order to improve signal routability.

The checking algorithms can detect all real power shorts and opens that final PD checks can, but it does not require the design database to be as complete as these final checks do. The fact that the invention's checking algorithms run quickly and catch important real errors, just as final full-chip checking does, creates a great incentive for their use.

The described toolset is intended to be executable at, but not limited to, the chip-level power distribution network. This provides great savings in the overall design cycle, particularly when applied on a regular schedule during the chip design process, thus allowing for early detection and correction of errors.

Because the checks allow easy detection of errors in any layer of power metal, the benefits of the invention and its resulting cost savings are considerable. The checks provided by the invention's toolset help to prevent many types of common chip power grid physical connection design errors, as well as certain chip IR-drop problems due to insufficient power connections. Power shorts can be detected for each metal level all at once, and not one at a time like conventional LVS and LVSC-based checks. Also, since the invention's checking method is for a chip floor plan that contains circuit abstracts, and not real circuit layouts (as in conventional LVS and DRC), its checking algorithms do not require as much memory and run time to complete.

Because the EPIC toolset works with chip floor plans containing circuit abstract models, its checks can be performed at any time throughout the design cycle, including the very early floor planning phase. Also, because macro abstract information is used instead of actual circuit layouts and no additional data translation is required for existing power connectivity information, the invention's checking algorithms do not require as much memory and run time to complete as existing LVS and LVSC checks. Fine-tuning or correction of power grid routing patterns and of floor planning data can therefore be resolved much sooner than can be accomplished with standard full-chip PD checks.

The described toolset helps produce a clean intermediate power grid used as input for post-routing steps such as power pin extensions and power via generation, thus improving the quality of such processes and reducing run-time for final full-chip PD checks.

One important goal for new chip designs is to repeatedly and quickly produce a high quality routed chip power grid as the floor plan evolves over time. A very important power grid design goal is to have a continuous power grid across the chip, typically from the chip's top metal down to a specified lower level of metal, in order to ensure proper circuit behavior in various end-user environments. The invention's toolset helps to achieve these design objectives much more effectively than is possible using the conventional PD checking methods.

Certain checking functions are meant to be used early in the design process to highlight possible improvements in the default full-chip power grid. Decisions made at this point have a direct impact on the behavior and the performance of subsequent power routing post-processing steps, such as adding macro power pin extensions and generating chip power vias.

Early evaluation provides a more pro-active approach to addressing identified underpowered rails. Underpowered rails are power wires for which no connection can be made to an upper or lower metal of the same power domain. These wires could be deleted at a very early checking step to improve a subsequent macro power pin extension process. Alternatively, they could be changed to connect to a different power domain in order to improve the distribution of that domain, or they could be changed to have smaller widths in order to improve signal routability. The invention provides programming aids to automatically implement the solution chosen from the above list of proposed changes.

With the described toolset, the modified routing and checking methodology effectively and consistently delivers high quality chip power distribution networks. By helping to eliminate real chip LVS, DRC, and PGA errors (relating to missing power via or underpowered rails), obvious major benefits to meeting schedule release dates are realized. Because these types of common design checking errors are automatically addressed as an integral part of the early chip power build process, efficient solutions requiring no extra wiring resource can be easily implemented.

As pointed out above, the described processes are usable throughout the chip physical design phase. The main objectives for adding these much earlier stages of power grid checking are: (1) to enable much earlier detection of power implementation problems without waiting for final chip PD verifications; (2) to provide corrective prevention of common chip PD checking and IR-drop errors due to insufficient power connections; (3) to produce better post power-routing results; and (4) to deliver a high quality full-chip power grid design, thus reducing final PD checking time.

The present invention is implemented in software to validate the physical implementation of full-chip power distribution networks to be built in hardware as part of an integrated chip design. The software can be contained on media usable by a computer such as semiconductor, optical and magnetic devices.

The embodiment depicted herein is one embodiment of the invention. There may be many variations to these diagrams or the steps (or operations) described therein without departing from the spirit of the invention. For instance, the steps may be performed in a different order, or steps may be added, deleted or modified. All of these variations are considered a part of the claimed invention.

While the preferred embodiment to the invention has been described, it will be understood that those skilled in the art, both now and in the future, may make various improvements and enhancements that fall within the scope of the claims that follow. These claims should be construed to maintain the proper protection for the invention first described.

What is claimed is:

1. An automated method of generating a semiconductor chip layout including validating a chip-level physical power distribution network to produce a corrected chip power grid, comprising:
    performing, by a computer, a plurality of checks dispersed through a final chip design process for detecting and correcting power connection problems as an integral part of a chip designing process by:
    using coded connectivity attributes in a chip power grid and a chip floor plan for a chip design to speed up a checking process;
    analyzing a full-chip power distribution network against circuit abstracts in the chip floor plan in place of actual circuit layouts for chips; and
    checking each power metal level in the network in succession against a power level above and/or below without building a complete logical representation of chip power metallurgy and via structure.

2. The method of claim 1, further comprising:
    containing net connectivity for all power metals in the chip power grid;
    containing circuit abstracts and net connectivity for all circuit pins in the chip floor plan; and
    modeling internal power and metal images using metal pin and blockage shapes in the circuit abstracts.

3. The method of claim 2, further comprising:
    finding power shorts, which are metals in a full-chip power grid of a same level but of different power connectivity intersecting with each other;
    finding floating power metals, which are metals in the full-chip power grid that do not intersect with any power metal or circuit power pin from either above or below and that are not connected to any circuit's power pin through a power wire extension existing in the full-chip power grid;
    finding power antennas, which are metals in the full-chip power grid that intersect only with a power metal or a power pin of a different power domain from above or below, so that no connection can be made;
    finding macro power shorts, which are metals in the full-chip power grid that intersect a circuit abstract's metal blockage shape or an abstract's pin shape of different connectivity; and
    finding macro power opens, which are macros placed in the chip floor plan, but that are disconnected from the full-chip power grid because its highest level of power pins does not intersect with any power metal of a next higher level or any power wire extension of the same level in the chip power grid.

4. The method of claim 3, wherein finding power opens and finding power shorts are executable independently and separately to any number of metal levels and power domains by providing explicit input specifications to one or more of:
    a specific power metal layer to be checked;
    a specific power net name to be checked; and
    specific upper and lower metal layer names to be checked against a power metal-under-test.

5. The method of claim 4, further comprising:
    performing post design checks after a final chip layout has been generated.

6. The method of claim 5, further comprising:
    feeding back errors detected by any mentioned check including post design checks for correction and checking.

7. The method of claim 1, further comprising:
    finding power shorts, which are metals in a full-chip power grid of a same level but of different power connectivity intersecting with each other;
    finding floating power metals, which are metals in the full-chip power grid that do not intersect with any power metal or circuit power pin from either above or below and that are not connected to any circuits's power pin through a power wire extension existing in the full-chip power grid;
    finding power antennas, which are metals in the full-chip power grid that intersect only with a power metal or a power pin of a different power domain from above or below, so that no connection can be made;
    finding macro power shorts, which are metals in the full-chip power grid that intersect a circuit abstract's metal blockage shape or an abstract's pin shape of different connectivity; and
    finding macro power opens, which are macros placed in the chip floor plan, but that are disconnected from the full-chip power grid because its highest level of power pins does not intersect with any power metal of a next higher level or any power wire extension of the same level in the chip power grid.

8. The method of claim 7, wherein finding power opens and finding power shorts are executed independently and separately to any number of metal levels and power domains by providing explicit input specifications to one or more of:
- a specific power metal layer to be checked;
- a specific power net name to be checked; and
- specific upper and lower metal layer names to be checked against a power metal-under-test.

9. The method of claim 1, further comprising:
performing post design checks after a final chip layout has been generated.

10. The method of claim 9, further comprising:
feeding back errors detected by any mentioned check including post design checks for correction and checking.

11. A computer program product having a program embodied on a non-transitory computer useable medium which, when executed by a computer, causes the computer to implement an automated method for validating a chip-level physical power distribution network for a semiconductor chip to produce a corrected chip power grid by detecting and correcting power connection problems during a chip design process and as an integral part of a chip power routing process, comprising:
- code for using coded connectivity attributes in a chip power grid and a chip floor plan for a chip design to speed up a checking process;
- code for analyzing a full-chip power distribution network against a chip floor plan containing circuit abstracts in place of actual circuit layouts; and
- code for checking each power metal level in succession against a power level above and/or below without building a complete logical representation of chip power metallurgy and via structure.

12. The computer program product of claim 11, further comprising:
- code for containing net connectivity for all power metals in the chip power grid;
- code for containing circuit abstracts and net connectivity for all circuit pins in the chip floor plan; and
- code for modeling internal power and metal images using metal pin and blockage shapes in the circuit abstracts.

13. The computer program product of claim 12, further comprising:
- code for finding power shorts, which are metals in a full-chip power grid of a same level but of different power connectivity intersecting with each other;
- code for finding power metals, which are metals in the full-chip power grid that do not intersect with any power metal or circuit power pin from either above or below and that are not connected to any circuit's power pin through a power wire extension existing in the full-chip power grid;
- code for finding power antennas, which are metals in the full-chip power grid that intersect only with a power metal or a power pin of a different power domain from above or below, so that no connection can be made;
- code for finding macro power shorts, which are metals in the full-chip power grid that intersect a circuit abstract's metal blockage shape or an abstract's pin shape of different connectivity; and
- code for finding macro power opens, which are macros placed in the chip floor plan, but that are disconnected from the full-chip power grid because its highest level of power pins does not intersect with any power metal of a next higher level or any power wire extension of the same level in the chip power grid.

14. The computer program product of claim 13, wherein code for finding power opens and code for finding power shorts are executable independently and separately to any number of metal levels and power domains by providing explicit input specifications to one or more of:
- a specific power metal layer to be checked;
- a specific power net name to be checked; and
- specific upper and lower metal layer names to be checked against a power metal-under-test.

15. The computer program product of claim 14, further comprising:
code for performing post design checks after a final chip layout has been generated.

16. The computer program product of claim 15, further comprising:
code for feeding back errors detected by a mentioned check including post design checks for correction and checking.

17. The computer program product of claim 11, further comprising:
- code for finding power shorts, which are metals in a full-chip power grid of a same level but of different power connectivity intersecting with each other;
- code for finding power metals, which are metals in the full-chip power grid that do not intersect with any power metal or circuit power pin from either above or below and that are not connected to any circuit's power pin through a power wire extension existing in the full-chip power grid;
- code for finding power antennas, which are metals in the full-chip power grid that intersect only with a power metal or a power pin of a different power domain from above or below, so that no connection can be made;
- code for finding macro power shorts, which are metals in the full-chip power grid that intersect a circuit abstract's metal blockage shape or an abstract's pin shape of different connectivity; and
- code for finding macro power opens, which are macros placed in the chip floor plan, but that are disconnected from the full-chip power grid because its highest level of power pins does not intersect with any power metal of a next higher level or any power wire extension of the same level in the chip power grid.

18. The computer program product of claim 17, wherein code for finding power opens and code for finding power shorts are executable independently and separately to any number of metal levels and power domains by providing explicit input specifications to one or more of:
- a specific power metal layer to be checked;
- a specific power net name to be checked; and
- specific upper and lower metal layer names to be checked against a power metal-under-test.

19. The computer program product of claim 11, further comprising:
code for performing post design checks after a final chip layout has been generated.

20. The computer program product of claim 19, further comprising:
code for feeding back errors detected by any mentioned check including post design checks for correction and checking.

* * * * *